United States Patent [19]
Hulett et al.
[11] Patent Number: 4,512,830
[45] Date of Patent: Apr. 23, 1985

[54] ELECTRICAL HEATING CAP

[76] Inventors: John G. Hulett; Robert Rothenberger, both c/o Dallas Products, Inc., 13948 Distribution Way, Dallas, Tex. 75234

[21] Appl. No.: 543,985
[22] Filed: Oct. 20, 1983

Related U.S. Application Data

[62] Division of Ser. No. 314,747, Oct. 26, 1981, Pat. No. 4,459,471.

[51] Int. Cl.³ ........................ B32B 3/00; B29D 23/10; H05B 3/06; A42B 1/22
[52] U.S. Cl. ...................................... 156/70; 156/217; 156/275.1; 156/308.4; 219/527; 128/380
[58] Field of Search ............... 219/527, 211, 529, 549, 219/212; 128/380, 379; 2/183, 171, 171.1; 156/65, 70, 182, 292, 298

[56] References Cited

U.S. PATENT DOCUMENTS

| | | | |
|---|---|---|---|
| 1,691,472 | 11/1928 | Graham et al. | 219/211 |
| 1,710,882 | 4/1929 | Larson | 219/527 |
| 2,028,889 | 1/1939 | Baddour | 219/527 |
| 2,431,882 | 12/1947 | Morten | 219/527 |
| 2,488,793 | 11/1949 | Amerken | 219/527 |
| 2,768,107 | 10/1956 | Magid | 156/70 |
| 2,957,792 | 10/1960 | Magid | 156/70 |
| 3,134,891 | 5/1964 | Hyer | 219/211 |
| 3,700,524 | 10/1972 | Sato | 156/218 |
| 3,858,028 | 12/1974 | Kerr | 219/211 |
| 3,988,568 | 10/1976 | Mantell | 219/211 |
| 4,061,898 | 12/1977 | Murray et al. | 219/211 |
| 4,147,921 | 4/1979 | Walter | 219/211 |

FOREIGN PATENT DOCUMENTS

| | | | |
|---|---|---|---|
| 353161 | 5/1922 | Fed. Rep. of Germany | 219/527 |
| 706261 | 3/1931 | France | 128/380 |
| 957852 | 2/1950 | France | 156/65 |
| 481061 | 5/1953 | Italy | 219/527 |
| 183333 | 6/1936 | Switzerland | 219/527 |
| 446788 | 5/1936 | United Kingdom | 128/380 |
| 1136788 | 12/1968 | United Kingdom | 219/527 |

*Primary Examiner*—Edward Kimlin
*Assistant Examiner*—Louis Falasco
*Attorney, Agent, or Firm*—Hubbard, Thurman, Turner & Tucker

[57] ABSTRACT

A heat cap is provided for applying heat to hair on a user's head, primarily to a pile or row of hair along the top of the user's head. The heat cap is shaped to conform substantially to the shape of the user's head with the pile of hair thereon so as to apply heat evenly to the hair. The heating coil is disposed in the heat cap only in those areas where heat is desired for the hair and is absent in areas of the heat cap where it is undesirable to apply heat to the head. An adjustable flap on each side of the heat cap enables the size of the cap to be adjusted to fit different users. The adjustable flaps also tend to hold the cap outward away from the ear and lower sides of the head and can be easily opened to enable access to the user's ear while the heat cap is being worn. An electrical thermostat automatically brings the heat cap to an optimal temperature and maintains the temperature during the desired conditioning period. The heat cap is manufactured by cutting a plurality of similarily shaped flat pieces and joining them together along certain corresponding sides.

4 Claims, 9 Drawing Figures

ELECTRICAL HEATING CAP

This application is a division, of application Ser. No. 314,747, filed Oct. 26, 1981 now U.S. Pat. No. 4,459,471.

BACKGROUND OF THE INVENTION

The frequent use of hot rollers and electrical hair dryers tends to cause hair damage, requiring periodic application of hair conditioning products. Preferably these conditioners are applied to damaged hair in a heat-controlled environment for a short period of time, usually about 30 minutes. Although it is preferable to apply hair conditioners in a salon under the supervision of a professional hair dresser, hair conditioning is also commonly self-applied at home using a commercially available heat cap or other heat controlled apparatus.

A number of heating caps for home use are presently available in the marketplace. These caps are commonly heavy and bulky thereby causing difficulties with handling and storage. More importantly, the heating caps of the prior art all appear to have a boat-like shape, best referred to as a "prairie schooner" design which is ill-constructed to apply even, uniform heat to damaged hair with conditioner thereon. This boat-like shape creates hot spots on the head causing burns to the skin and scalp of the user. Many prior art heat caps are also constructed to apply heat to unnecessary body areas thereby wasting energy and causing additional discomfort to the ears and forehead of the user.

The heat caps of the prior art also typically have a two-way or three-way switch allowing only a limited selection of temperature choices, thereby frequently resulting in burns or inefficient usage by the inexperienced wearer. Finally, the unwieldy construction and shape of prior art heat caps makes it very difficult to assemble said products, thereby increasing the cost and complexity of manufacturing and maintenance.

SUMMARY OF THE INVENTION

The present invention is designed to overcome the difficulties discussed above with prior art heat caps. The heat cap of the present invention is specifically constructed to form a prismoidal-like cavity open at the base and conforming approximately to the shape of a user's head with a row of hair piled thereon. The heating cap of the present invention provides for electrical heating elements only in areas of the heat cap which are adjacent to said row of hair and other hair about said row of hair, with the heating means being disposed throughout the conditioning zone at a substantial uniform distance from the row of hair. The remainder of the heat cap comprises a cool zone adjacent to portions of the user's head other than those portions with hair thereon, the cool zone being without any heating means and thereby saves on energy usage and minimizes the possibility of burns to the user's skin or scalp. This cool zone is also preferably substantially spaced from the user's head portions for which no heat is needed.

The present invention also provides an electrical thermostat for automatically bringing the heating cap to an optimal temperature and then holding the heat at that temperature during the desired conditioning period. The present invention also utilizes a flexible material for the heating cap having adjusting means for changing the size of the curved cavity so as to fit users' heads of different sizes. This adjustment means preferably also includes openings adjacent to the ears of the user's head so as to minimize any obstruction to hearing by the user and to allow the user to utilize the telephone during the heat conditioning process. The heating cap in the present invention also includes substantial insulating elements between the heating means and the inner surface of the heating cap so as to protect the user's head from exposure to extreme heat from any unlikely malfunction of the heating cap.

One embodiment of the present invention comprises a heating cap for applying heat to a pile of hair on top of a user's head. The heating cap includes a curved shell forming an open cavity with an inner surface shaped to conform substantially to the shape of the user's head with said pile of hair thereon. The heating cap also includes heating means disposed within the shell for radiating heat through the inner surface to heat the pile of hair and other hair on the user's head. The inner surface of the shell has a conditioning zone adjacent to the pile of hair with heating means disposed throughout this conditioning zone at a substantially uniform distance from the pile of hair. The heating cap also includes a cool zone adjacent to portions of the user's head other than the top of the head having the pile of hair thereon and other hair on the user's head, the cool zone being without any heating means.

In another embodiment of the present invention, the heating cap is provided for applying heat to a row of hair lying primarily along the top of the head. The heating cap includes an outer covering having first and second sides, each having a curvilinear edge joined to the curvilinear edge of the other side and a second edge separated from the second edge of the other side to form a prismoidal-like cavity open at the base conforming approximately to the shape of the user's head and a row of hair thereon. The heating cap also includes an inner covering conforming substantially to the shape of the outer covering and connected thereto along corresponding edges to form a closed cavity between the inner and outer coverings. The heating cap further includes heating means within such closed cavity throughout the portion of said cavity adjacent the row of hair, for radiating heat through the inner covering to the row of hair.

In a further embodiment of the present invention, a method of manufacturing a heating cap is provided, including the steps of cutting identically shaped first and second flat flexible members. Each said member has wing-shaped member pairs which are mirror-images of each other and which are joined together by a common bridge portion. Each wing-shaped portion includes first and second curvilinear edges separated by the bridge portion. The method includes the step of disposing a heating element and insulation material between the first and second flat members. The first and second flat members are joined together along their commonly-shaped edges and folded along their common bridge portions so that the corresponding mirror-image member pairs of both members overlay each other. Finally the commonly curvilinear edges of each mirror-image member pair are joined together to form a flat heat cap having flexible sides which separate to form a cavity which conforms substantially to the shape of a human head having hair piled on thereof.

From the foregoing, it can be seen that there are several advantages to the present invention in view of the prior art. The construction of the heat cap of the present invention is such that it is shaped to fit a user's head with hair piled thereon so as to provide uniform heat to the hair being conditioned. Heating elements are provided in the heat cap only where needed to condition the hair, with a cool zone being provided elsewhere for the safety of the user and to minimize energy usage. The heat cap of the present invention is adjustable for different size heads. It includes an automatic thermostat to prevent overheating and to reach optimum energy usage and conditioning of the hair, and it includes an insulation pad between the coils and the head to prevent burning of the scalp. Finally, the size and construction of the present invention makes it extremely easy to manufacture, package and store and results in an attractive, lightweight relatively inexpensive heat cap.

The following detailed description of the present invention together with reference to the figures shown therein provides additional features and advantages of the present invention as follows.

DETAILED DESCRIPTION OF THE PREFERRED EMBODIMENT

Figure 1:
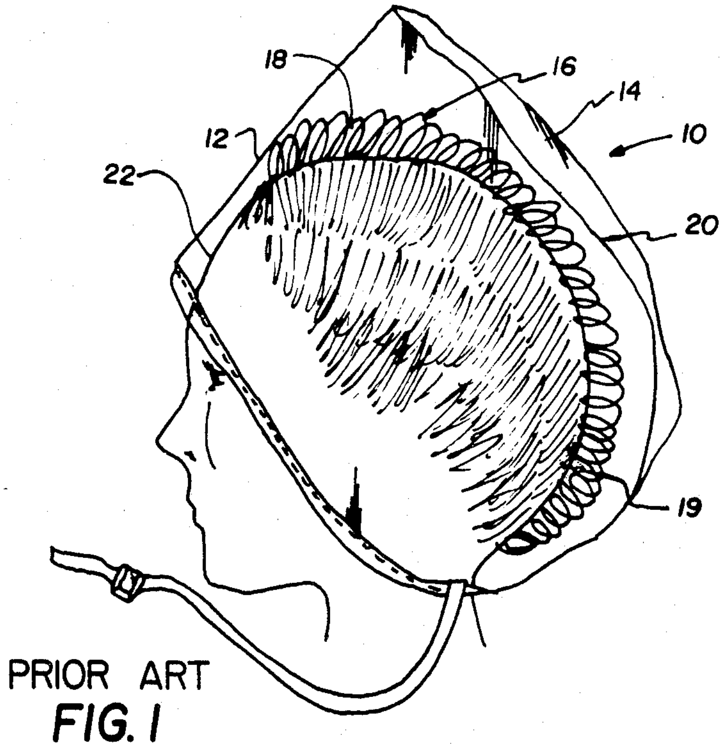
PRIOR ART FIG. 1
FIG. 1 is a perspective view of a typical prior art heating cap in place on the user's head.

Referring now to the figures, a detailed description is given of a preferred embodiment of the invention as illustrated in the accompanying drawings. FIG. 1 shows a typical example of a prior art heating cap 10 similar in shape to many others of the prior art. Its "prairie schooner" shape is typified by a high vertical side 12 curving around the head of the wearer and terminated with a flat top 14 which curves downward around the back of the wearer's head.

For purposes of illustration only, the heating cap is shown as being transparent so that the position of the wearer's head can be seen. The disadvantages of the shape of this prior art heat cap are readily apparent. The flat top 14 of the cap tends to rest substantially flush along the top of the head where a row of hair 16 has been piled for the conditioning process. However, the portions of the hair row 18 and 19 at the front and back of the head respectively are a substantially greater distance removed from the electrical heating cap than the center portion 20 of the hair row 16 which is normally pushed flat against the user's head by the top of cap 10. Thus, a uniform distribution of heat to the hair is not possible with this shape.

Moreover, in typical prior art heating caps of the type shown in FIG. 1, the electrical heating coils are placed throughout the heating cap, thus applying heat to various parts of the face, head and neck which do not require heat for the conditioning process. A particularly likely place for the application of undesirable heat is the forehead 22 of the wearer which typically lies quite close to the side wall 12 of the heating cap. Moreover, the wearer's ears and parts of the upper face normally rest quite close to the side wall 12. The result is that the wearer may be burned or injured by excessive heat, especially where the flat top of the cap tends to rest substantially flush along the top of the head and at other unprotected areas of the face and head. Alternately, the wearer may adjust the heat low enough to be comfortable to those portions where heat is not desired, thus substantially diminishing the effectiveness of the heat cap in applying heat to the row of hair 16–20 on top of the wearer's head.

Prior art heating caps of the type shown in FIG. 1 are also difficult to assemble, having as many as 25 steps involved in the assembly, most of which require manual labor. Since the hat does not naturally lie flat, it cannot be manufactured or cut with a die and needs to be sewed together by hand. Moreover, the shape of prior art caps of the type shown in FIG. 1, make them difficult to store and ship. Finally, the heat loss from having heating coils spaced through the prior art heat cap 10 is substantial. As much as 60% of the heat of these caps may be lost because of placement of coils in locations not requiring the application of heat to the hair.

Figure 2:
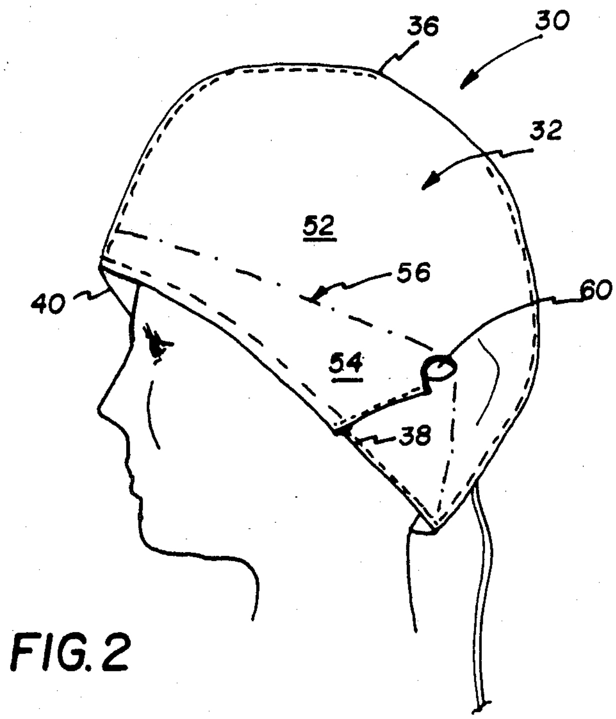
FIG. 2 is a side perspective view of a preferred embodiment of the heating cap of the present invention disposed on a user's head.
Figure 3:
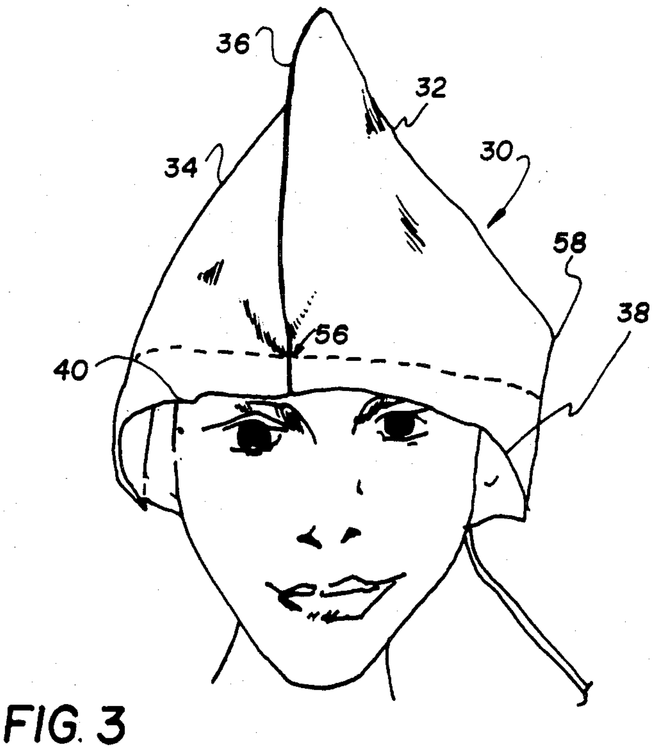
FIG. 3 is a front perspective view of the heat cap of the present invention shown in FIG. 2.

FIGS. 2 and 3 show a preferred embodiment of the electrical heating cap 30 of the present invention. The cap comprises two hemispherical sides 32 and 34 which are joined together about their curved periphery 36 and not joined along their diametrical straight sides 38 and 40 respectively. The resulting shape of the heating cap 30 is such that it forms an open cavity within which the user's head, with a pile of hair thereon, comfortably fits.

Figure 4:
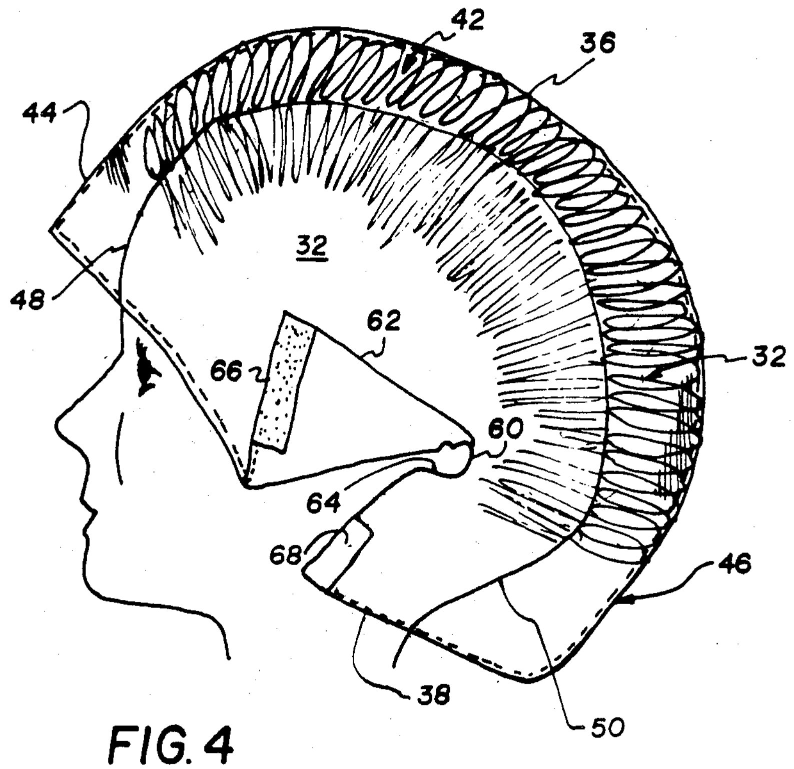
FIG. 4 is a side elevation view of the heating cap of FIG. 1 in a flat position off of the user's head.

FIG. 4 also shows a transparent head cap for purposes of illustration only to show the advantages of the heat cap of the present invention. As shown, the hair is piled on top of the user's head from the hair in the front, on the sides, and at the back of the wearer to form a row 42 lying along the top center of the head. This row is substantially equally spaced from the peaked top 36 of the heat cap along the top of the wearer's head. It is also spaced at substantially equal distances from the sides 32 and 34 of the electrical heat cap. Moreover, the shape of the heat cap of the present invention disposes the front and back 44 and 46 respectively of the cap peak a substantial distance from the wearer's forehead 48 and back of head 50 respectively. Thus, undesirable heat is not applied to the portions of the wearer's head for which heat is not required.

The heat cap 30 of the present invention comprises a hot zone 52 and a cold zone 54 separated by a dotted line 56 which is shown in FIGS. 2 and 3 only for purposes of illustration. Dotted line 56 runs horizontally just about the wearer's ears from the front to the back of the cap. In the hot zone 52, heating elements are uniformly spaced within the heat cap to apply heat to the portion of hair primarily piled on top of the wearer's head. No heating elements are provided in the cool zone 54 so that the wearer's forehead, ears and face are not subjected to undesirable heat which can cause discomfort or injury to the wearer. Moreover, by omitting the heating elements from undesirable areas in the heat cap 30, a substantial amount of electricity is save, thus resulting in a much more efficiently operated heat cap.

The resulting shape of the heat cap 30 of the invention provides a peaked top 36 which is up high around the top of the head where the hair of the wearer is piled high so as to apply heat uniformly to the hair without pushing the hair down or applying heat also to the uncovered scalp. The sides 32 and 34 of the heat cap 30 slant outward to conform substantially to the shape of the user's head and continue outward to a point 58 with a curved opening 60 for the wearer's ear. Thus, the heat cap 30 extends out away from the ear to minimize the application of undesirable heat to the ear and also provides for an aperture 60 through which the wearer can hear. The heat cap also extends outward away from the forehead of the wearer and away from the sides of wearer's head and face not requiring heat. Moreover, the cool zone 54 of the heat cap 30 also minimizes the application of heat to parts of the face and scalp where it is not needed. Thus, the heat cap of the present invention uniformly applies heat to the conditioned hair of the wearer while substantially minimizing the use of power and increasing the comfort of the wearer.

Referring again to FIG. 4, it can be seen that the side piece 32 of the heat cap includes an opening extending from the base 38 to the ear aperture 60. As a result, two opposing flaps 62 and 64 are formed each having an attachment member 66 and 68 respectively affixed thereto for attachment to each other. In the present embodiment shown in FIG. 4, attachment member 66 runs along the base 38 of cap side 32 and attachment member 68 runs substantially vertically along the flap side 64. Attachment member 66 and 68 are preferably made of some type of self-attaching material or device such as "VELCRO". By positioning members 66 and 68 substantially perpendicular to each other, the flaps may be adjusted relative to each other so that the open cavity formed by the heating cap 30 may be made larger or smaller to fit the heads of different wearers.

When desired, attachment members 66 and 68 may be disconnected so that flap 62 as shown in FIG. 4 or flap 64 may be bent back away from the wearer's head to more completely expose the wearer's ear for listening or using the telephone without removing the heat cap.

Figure 5:
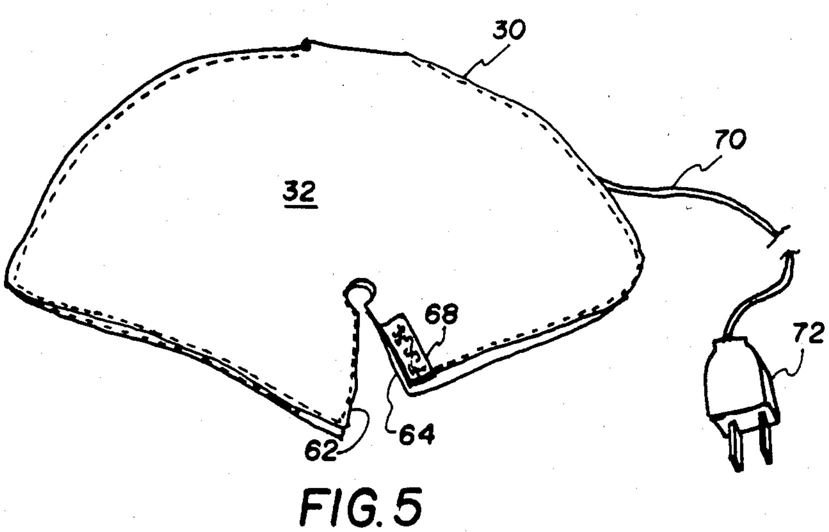
FIG. 5 is a side view of the heating cap of FIG. 1 showing the adjustment means thereof.

Referring now to FIG. 5, the heat cap 30 of the present invention is shown in a flat position removed from the wearer's head. In this position, the sides 32 and 34 of heat cap 30 lie flat against each other so that heat cap 30 may be easily stored. Attachment members 66 and 68 on flap 62 and 64 respectively are disconnected. FIG. 5 also shows an electrical heating cord 70 running from the back of the heat cap to an electrical plug 72. Preferably, no manually operated heat switch is needed for the selection of different temperatures by the wearer. Instead, heat cap 30 includes a conventional thermostat therein for sensing the temperature within the heat cap and maintaining the heating coils on or off so as to achieve and hold this optimal temperature. In the preferred embodiment of the present invention, the air temperature within the cavity of the cap is preferably held at about 125° F. for a 30-minute conditioning period.

Figure 6:
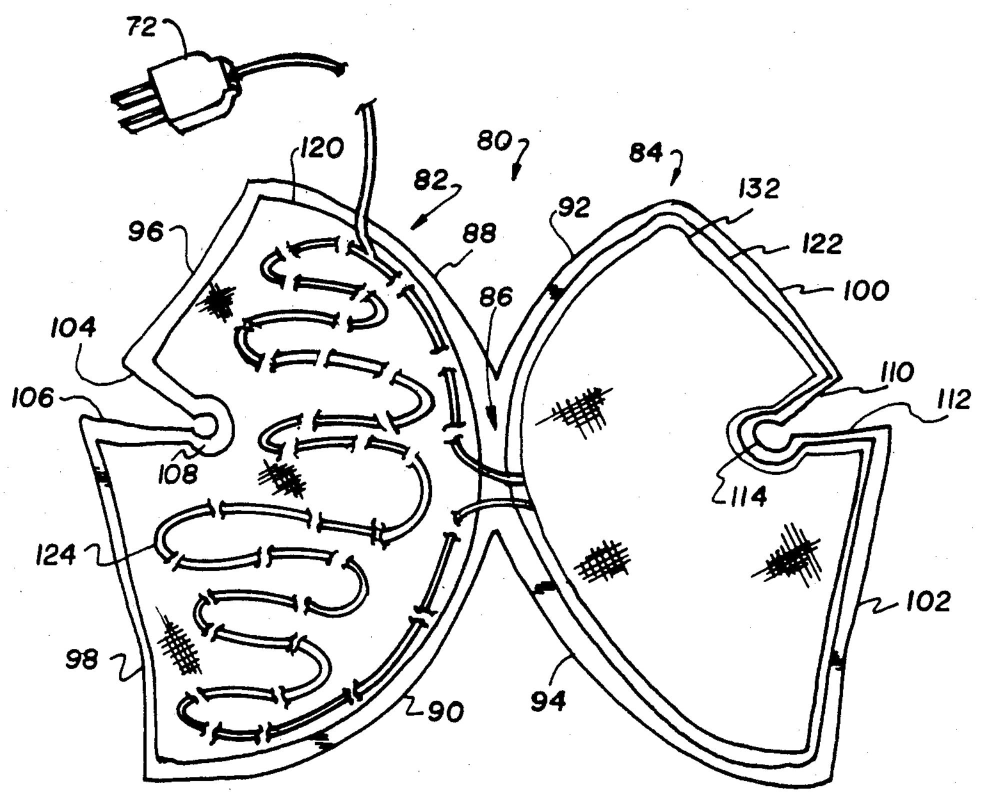
FIGS. 6, 7 and 8 are views of the heat cap in FIG. 1 showing a preferred method of construction of the heating cap of the present invention.
Figure 7:
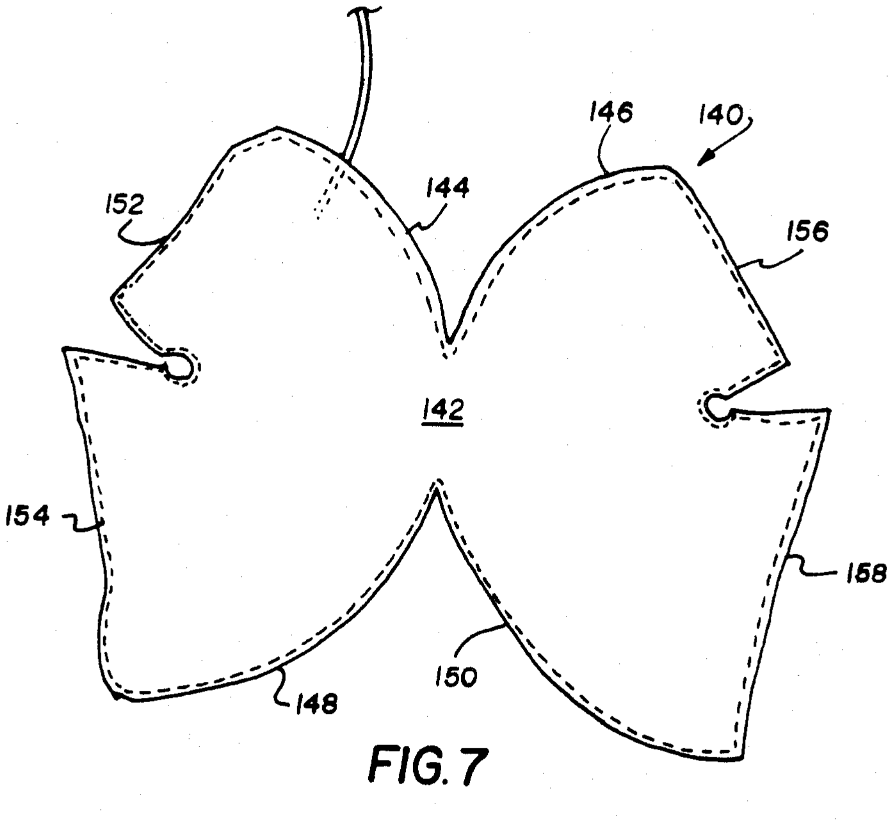
Figure 8:
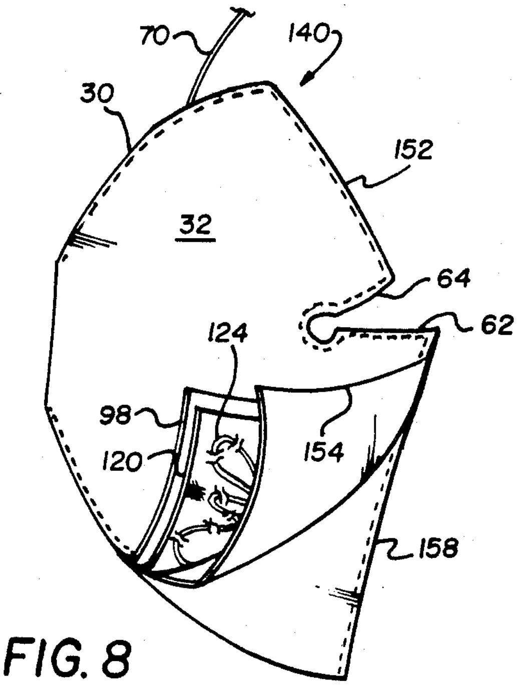

Referring now to FIGS. 6, 7 and 8, a preferred method of manufacturing the heating cap of the present invention is shown. A flexible "wing-shaped" member 80 is cut from a long-wearing heat resistant material such as reinforced vinyl. Member 80 is cut to form two wing pairs 82 and 84, being mirror-images of each other, which are joined together by common bridge portion 86. Wing member 82 has first and second curvilinear edges 88 and 90 which are separated by bridge portion 86. Wing member 84 likewise has similar curvilinear edges 92 and 94. Wing member 82 also has a substantially straight edge 96, extending substantially radially from the curvilinear edge 88 and a second radial edge member 98 extending from the far end of curvilinear edge 90 opposite bridge 86. Wing member 84 has similar edges 100 and 102. A "pie-wedgeshaped" opening is formed between edges 96 and 98 by flaps 104 and 106 which meet at a circular aperture 108. aWing member 84 has similar flap members 110 and 112 terminating at a circular aperture 114.

An insulation member 120 is cut to approximately the shape of wing member 82 but being slightly smaller about its periphery. A similar insulation pad 122 is cut to overlay wing member 84. This insulation pad may be of any suitable insulating material such as "Keflon". A heating element 124 is disposed about a portion of insulation pads 120 and 122 so as to provide a substantially even heating through the portion of the heat cap previously referred to as the ¢hot zone". In the preferred embodiment shown in FIG. 6, the heating element is a small, insulated, flexible wire having sufficient resistance to generate substantial and uniform heat along its length. This heating element 124 also covers a corresponding portion of insulation pad 122 (not shown).

A second insulation pad 132 is then cut and placed over the top of insulation pad 122 and the heating coil 124 thereon. Insulation pad 132 has preferably substantially the same size and shape as insulation pad 122. Correspondingly, a second insulation pad (not shown) is also cut and placed over the top of insulation pad 120 and the heating element line disposed thereon.

Referring now to FIG. 7, a second "wing-shaped" member 140 is cut having a shape and size substantially identical to that of wing-shaped member 80. Wing-shaped member 140 is then disposed over wing-shaped member 80 with the insulation pads and heating element which were previously described disposed between members 80 and 140. These two members are then joined together along their commonly-shaped edges by sewing, heat-sealing, gluing, or the like. Preferably, the bridge portion 142 is not sewed directly to bridge portion 86 of member 80 since there are no open edges, so that the heating element can extend freely between opposite sides of the members.

Finally, in FIG. 8, wing-shaped members 80 and 140 are folded along their corresponding bridge portions 86 and 142 so that the mirror-image pairs of both members are folded on each other. The mirror-image pairs are then attached together along common curvilinear edges 144 and 146 and common curvilinear edges 148 and 150 as shown in FIGS. 7 and 8. This attachment may be accomplished preferably by heat-sealing, sewing, gluing or the like. The straight edges of the common wing-shaped pairs 152, 154, 156 and 158 are not joined together so as to leave an opening over which the heat cap may fit on to the wearer's head.

Figure 9:
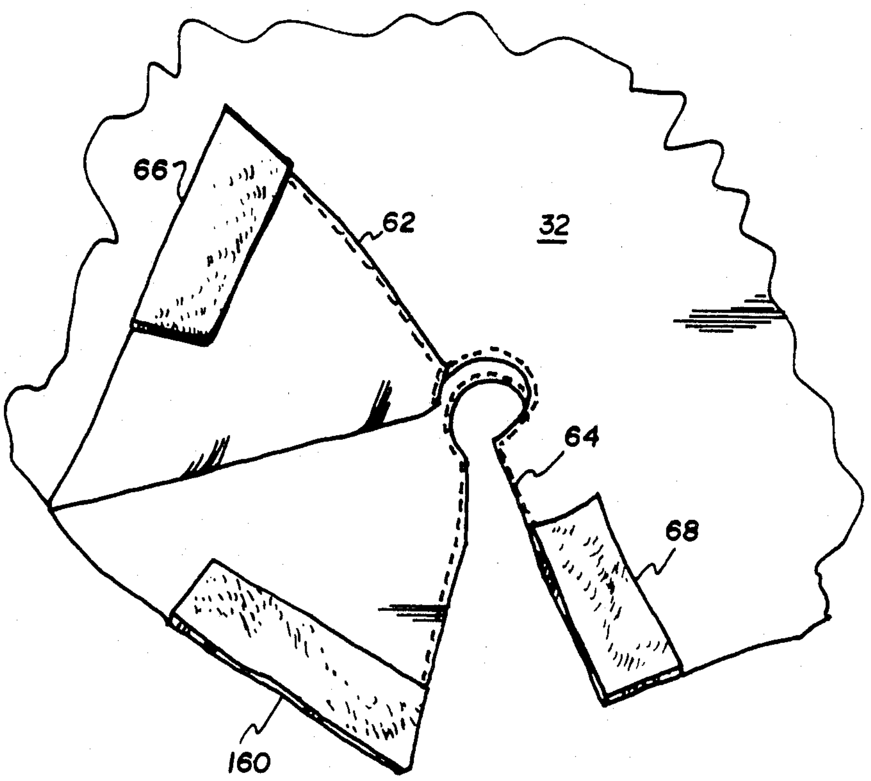
FIG. 9 is an exploded view of a portion of the heating cap shown in FIG. 8 with one of the adjustment flaps folded back to show the adjusting means of the present invention.

Referring now to FIG. 9, the adjusting members 66 and 68 are attached to the flaps 62 and 64 of the side 32 of the heat cap 30. Similar adjusting members are attached to side 34 opposite side 32, including adjusting member 160 shown in FIG. 9. Members 66 and 68 are preferably attached by sewing or gluing but may be attached in any other suitable manner. As previously mentioned, members 66 and 68 are affixed so that the two members may be attached together at different positions allowing the wearer to adjust the size of the head cavity formed by the heat cap.

Although a preferred embodiment of the present invention has been described and disclosed in detail, it should be understood that the present invention includes other obvious modifications besides the embodiments shown. For example, the electrical heating cap of the present invention may be formed in somewhat different shapes from that shown, provided that the cap shape provides an open head cavity designed substantially to fit the wearer's head having hair piled on the top thereof for conditioning. It should also be understood that different other suitable fabrics and materials may be utilized other than those described herein which have the necessary flexible and heat properties required for satisfactory operation of the heat cap of the present invention. Moreover, other minor modifications in the positioning of the heating elements and insulation pads which clearly fall within the scope of the present invention.

What is claimed is:

1. A method of manufacturing a heating cap to be worn during a hair treating process, comprising:

providing identically shaped first and second flat flexible plastic members, each member having a pair of wing-shaped portions which are mirror-images of each other, and which are joined together by a common bridge portion, each wing-shaped portion including first and second curvilinear edges separated by said bridge portion and opposed circular apertures formed in said members, respectively, providing a piece of insulation material having the general shape of each of said wing-shaped portions, placing one of said pieces of insulation material on each wing-shaped portion of said first member, placing a resistance type electrical heating element on each piece of insulation material on said first member, placing another of said pieces of insulation material on each piece of insulation material on said first member and covering said heating element on each wing-shaped portion, placing said second member over said first member and aligned therewith so that the peripheral edges of said members including edges defining said apertures are coextensive;

securing said members together along said edges, folding each of said first and second members along their respective common bridge portions so that the corresponding mirror-image wing-shaped portions of both members overlay and are aligned with each other; and attaching the curvilinear edges formed by one of the wing shaped portions of said first and second members to the curvilinear edges of the mirror image wing shaped portions of said first and second members to form a flat heating cap having flexible sides which separate to form a cavity conforming substantially to the shape of a human head.

2. The method set forth in claim 1 including the steps of:

providing said members with opposed edges intersecting said apertures to form a wedge shaped opening between said apertures and further edges of said members; and joining said first and second members to each other along said opposed edges intersecting said apertures and along said further edges to enclose said insulation material and said heating element between said first and second members.

3. The method set forth in claim 2 including the steps of:

providing said pieces of insulation material of a size such that a border is provided substantially all around the periphery of said first member and is exposed to a corresponding border of said second member;

heat sealing said borders together; and heat sealing said borders along said curvilinear edges upon folding said first and second members to overlay each other to join said members so as to form said cavity.

4. The method set forth in claim 2 including:

the steps of providing fastening members for attachment to said wing-shaped portions on opposite sides of said wedge shaped openings, respectively, and securing said fastening members on said wing-shaped portions so that said fastening members on the same side of said cap may be joined together to adjust the size of said cavity.

* * * * *